(12) United States Patent
Ito

(10) Patent No.: US 10,144,425 B2
(45) Date of Patent: Dec. 4, 2018

(54) VEHICLE TRAVELING CONTROL DEVICE

(71) Applicant: TOYOTA JIDOSHA KABUSHIKI KAISHA, Toyota-shi (JP)

(72) Inventor: Tatsuya Ito, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 132 days.

(21) Appl. No.: 15/274,917

(22) Filed: Sep. 23, 2016

(65) Prior Publication Data
US 2017/0080940 A1  Mar. 23, 2017

(30) Foreign Application Priority Data
Sep. 23, 2015  (JP) ................................ 2015-186185

(51) Int. Cl.
*B60W 30/16*  (2012.01)
*B60W 10/184*  (2012.01)
(Continued)

(52) U.S. Cl.
CPC ............ *B60W 30/16* (2013.01); *B60W 10/06* (2013.01); *B60W 10/18* (2013.01);
(Continued)

(58) Field of Classification Search
CPC .... B60W 30/16; B60W 10/184; B60W 10/18; B60W 10/06; B60W 2550/302;
(Continued)

(56) References Cited

U.S. PATENT DOCUMENTS 7,603,215 B2 * 10/2009 Matsumoto ............ G08G 1/167
701/300
8,547,249 B2 * 10/2013 David ..................... G08G 1/166
340/435
(Continued)

FOREIGN PATENT DOCUMENTS

DE   10 2009 007 885 A1   8/2010
JP        10-338055 A     12/1998
(Continued)

OTHER PUBLICATIONS

Extended European Search Report dated May 17, 2017 in Patent Application No. 16185682.8.

*Primary Examiner* — Jaime Figueroa
(74) *Attorney, Agent, or Firm* — Oblon, McLelland, Maier & Neustadt, L.L.P.

(57) ABSTRACT

A control device detects a first vehicle traveling in front of an own vehicle using a front looking radar device, and detects a second vehicle which is predicted to cut in between the own vehicle and the first vehicle using the front looking radar device and/or front-side looking radar devices. The control device calculates a first target acceleration required for the own vehicle to maintain an inter-vehicle distance between the own vehicle and the first vehicle at a first set inter-vehicle distance; and calculates a second target acceleration required for the own vehicle to maintain an inter-vehicle distance between the own vehicle and the second vehicle at a second set inter-vehicle distance. The control device selects either the first target acceleration or the second target acceleration and controls the own vehicle in such a manner that an actual acceleration of the own vehicle becomes closer to the mediated target acceleration.

2 Claims, 9 Drawing Sheets

(51) Int. Cl.
*B60W 10/18* (2012.01)
*B60W 10/06* (2006.01)

(52) U.S. Cl.
CPC ....... *B60W 10/184* (2013.01); *B60W 2420/42* (2013.01); *B60W 2420/52* (2013.01); *B60W 2550/302* (2013.01); *B60W 2550/304* (2013.01); *B60W 2550/306* (2013.01); *B60W 2550/308* (2013.01); *B60W 2720/106* (2013.01)

(58) Field of Classification Search
CPC ..... B60W 2550/304; B60W 2550/306; B60W 2720/106; B60W 2420/52; B60W 2420/42; B60W 2550/308
USPC ....................................................... 701/1, 96
See application file for complete search history.

(56) References Cited

U.S. PATENT DOCUMENTS

| | | | | |
|---|---|---|---|---|
| 9,193,356 | B2* | 11/2015 | Niem | B62D 15/025 |
| 2001/0040505 | A1* | 11/2001 | Ishida | G01C 21/3697 |
| | | | | 340/435 |
| 2003/0120414 | A1* | 6/2003 | Matsumoto | B60K 31/0008 |
| | | | | 701/96 |
| 2006/0250224 | A1* | 11/2006 | Steffel | G01S 13/931 |
| | | | | 340/435 |
| 2008/0243351 | A1* | 10/2008 | Isogai | B60W 30/16 |
| | | | | 701/96 |
| 2009/0164083 | A1* | 6/2009 | Thiel | B60W 30/143 |
| | | | | 701/96 |
| 2011/0001635 | A1* | 1/2011 | Akens | G08G 1/04 |
| | | | | 340/936 |
| 2011/0210866 | A1* | 9/2011 | David | G08G 1/163 |
| | | | | 340/903 |
| 2011/0238309 | A1 | 9/2011 | Tsunekawa | |
| 2015/0100217 | A1 | 4/2015 | Sudou et al. | |

FOREIGN PATENT DOCUMENTS

| | | |
|---|---|---|
| JP | 2004-114906 A | 4/2004 |
| JP | 2004-249761 A | 9/2004 |
| JP | 2005-263098 A | 9/2005 |
| JP | 2008-296887 A | 12/2008 |
| JP | 2014-148293 A | 8/2014 |

\* cited by examiner

VEHICLE TRAVELING CONTROL DEVICE

BACKGROUND

1. Field

The present disclosure relates to a vehicle travelling control device which permits an own vehicle to follow an objective-forward-vehicle which is travelling/proceeding in front of (ahead of) the own vehicle so as to keep a predetermined inter-vehicle distance with respect to the objective-forward-vehicle.

2. Description of the Related Art

A vehicle travelling control device that is conventionally known (hereinafter, referred to as a "conventional device") predicts that the other vehicle will cut in between the own vehicle and the objective-forward-vehicle, when the own vehicle is following (i.e., trailing) the objective-forward-vehicle, and the lateral position of the other vehicle moves towards a travelling lane of the own vehicle with a (lateral) speed equal to or higher than a predetermined value.

In addition, the conventional device calculates a target acceleration based on the other vehicle when the device predicts that the other vehicle will cut in, and controls an acceleration of the own vehicle in accordance with the calculated acceleration (e.g., refer to Japanese Laid Open Patent Application No. 2014-148293 (especially, paragraph 0035, paragraph 0038, and FIG. 5).

SUMMARY

However, according to the conventional device, a problem may arise. That is, for example, the own vehicle may approach the objective-forward-vehicle too quickly, when the objective-forward-vehicle starts a rapid deceleration at a point in time at which the conventional device predicts that the other vehicle will cut in, and the other vehicle does not actually cut in after the prediction.

The present disclosure addresses the problem described above. That is, one of the objects of the present disclosure is to disclose a vehicle travelling control device which can perform a more appropriate control when it is predicted that the other vehicle will cut in between the own vehicle and the objective-forward-vehicle.

The vehicle travelling control device according to the present disclosure (hereinafter, referred to as the "presently disclosed device") includes detecting means for detecting an objective-forward-vehicle traveling in front of an own vehicle, and a predicted cut-in vehicle which is predicted to cut in between the own vehicle and the objective-forward-vehicle (21, 22R, 22L, 20, step 310, step 420, step 440, step 810); first calculation means for calculating, as a target acceleration for trailing travel (G1tgt), a target acceleration required for the own vehicle to maintain an inter-vehicle distance between the own vehicle and the objective-forward-vehicle at a first set inter-vehicle distance (Dtgt) (20, step 320 to step 340); second calculation means for calculating, as a target acceleration for a cut-in vehicle (G2tgt, G3tgt), a target acceleration required for the own vehicle to maintain an inter-vehicle distance between the own vehicle and the predicted cut-in vehicle at a second set inter-vehicle distance (Dtgt) (20, step 430, step 435, step 455, step 460, step 820, step 830); mediation means for selecting, as a mediated target acceleration (Gfin), either the target acceleration for the trailing travel or the target acceleration for the cut-in vehicle, whichever is smaller (20, step 710, step 910); and travel control means for controlling a driving force and a brake force of the own vehicle in such a manner that an actual acceleration of the own vehicle becomes closer to the mediated target acceleration (Gfin) (20, 30, 32, 40, 42, step 720, step 920).

According to the present disclosure, the target acceleration required for the own vehicle to maintain the inter-vehicle distance between the own vehicle and the objective-forward-vehicle at the first set inter-vehicle distance is calculated, as the target acceleration for trailing travel. Also, the target acceleration required for the own vehicle to maintain the inter-vehicle distance between the own vehicle and the predicted cut-in vehicle at the second set inter-vehicle distance is calculated, as the target acceleration for cut-in vehicle. Then, either the target acceleration for trailing travel or the target acceleration for cut-in vehicle, whichever is smaller, is selected, as the mediated target acceleration (Gfin). The acceleration of the own vehicle is controlled in accordance with the mediated target acceleration (Gfin). It should be noted that the first set inter-vehicle distance may be the same as or different from the second set inter-vehicle distance.

Generally, since the inter-vehicle distance between the own vehicle and the predicted cut-in vehicle is shorter than the inter-vehicle distance between the own vehicle and the objective-forward-vehicle, the target acceleration for cut-in vehicle is smaller than the target acceleration for trailing travel. Accordingly, when the predicted cut-in vehicle is detected, the target acceleration for cut-in vehicle is selected as the mediated target acceleration frequently, according to the presently disclosed device. Thus, the own vehicle decelerates so as to increase the inter-vehicle distance between the own vehicle and the objective-forward-vehicle. Consequently, when the predicted cut-in vehicle actually cuts in, the inter-vehicle distance between the own vehicle and the predicted cut-in vehicle becomes appropriate in a short time.

On the other hand, if the objective-forward-vehicle starts to rapidly decelerate after a point in time at which the predicted cut-in vehicle is detected, the target acceleration for trailing travel becomes smaller than the target acceleration for cut-in vehicle. Therefore, in this case, the target acceleration for trailing travel is selected as the mediated target acceleration, according to the presently disclosed device. Accordingly, the own vehicle decelerates so as to ensure/acquire an appropriate inter-vehicle distance between the own vehicle VA and the objective-forward-vehicle. As a result, the inter-vehicle distance between the own vehicle and the objective-forward-vehicle becoming excessively short can be avoided when the predicted cut-in vehicle does not actually cut in.

In one of aspects of the presently disclosed device, the detecting means includes a front looking radar device (21), whose detection area has a center axis extending in a straight forward direction (C1) of the own vehicle, which detects the target object to obtain first target object information concerning the target object; a front-side looking radar device (22R, 22L), whose detection area has a center axis extending in a diagonally forward direction (CL or CR) of the own vehicle, which detects the target object to obtain second target object information concerning the target object; and predicted cut-in vehicle detecting means for integrating the first target object information and the second target object information to obtain an integrated target object information, and detecting the predicted cut-in vehicle based on the integrated target object information, when the front looking radar device and the front-side looking radar device detect an identical target object (20, step 410, step 415, step 420), and for detecting the predicted cut-in vehicle based on the second target object information but not based on the first target object information, when the front-side looking radar device detects an target object, but the front looking radar device does not detect the target object (20, step 410, step 440).

Further, the second calculation means is configured to calculate the target acceleration for cut-in vehicle in such a manner that the target acceleration for cut-in vehicle is allowed to be a negative acceleration achieved when a brake device of the own vehicle is operated, in a case where the predicted cut-in vehicle is detected based on the integrated target object information (20, step 435), and calculate the target acceleration for cut-in vehicle while providing a limitation on the target acceleration for cut-in vehicle in such a manner that the target acceleration for cut-in vehicle does not become smaller than a negative acceleration achieved when a throttle valve opening of an internal combustion engine serving as a driving force of the own vehicle is set at a minimum value while the brake device of the own vehicle is not operated, in a case where the predicted cut-in vehicle is detected based on the second target object information but not based on the first target object information (20, step 460).

The detection area of the front looking radar device and the detection area of the front-side looking radar device have a portion that overlaps with each other (refer to FIG. 1). Further, the front looking radar device is a main radar for obtaining information necessary for the trailing travel. Therefore, generally, an accuracy of the information obtained by the front looking radar (e.g., a relative distance for the target object) is higher than an accuracy of the information obtained by the front-side looking radar.

Thus, the predicted cut-in vehicle detecting means in the above aspect integrates the target object information obtained by the front looking radar device (first target object information) and the target object information obtained by the front-side looking radar device (second target object information) to obtain the integrated target object information, when the front looking radar device and the front-side looking radar device detect the identical target object. Further, the second calculation means calculates the target acceleration for cut-in vehicle based on the integrated target object information. In this case, the integrated target object information is based on the first target object information obtained by the front looking radar device having relatively higher accuracy, and thus, the detecting accuracy for the predicted cut-in vehicle is higher than the detecting accuracy for the predicted cut-in vehicle which is detected based solely on the front-side looking radar device having relatively lower accuracy. Therefore, the possibility that the predicted cut-in vehicle does not actually cut in is relatively low. In view of the above, the second calculation means calculates the target acceleration for cut-in vehicle in such a manner that the target acceleration for cut-in vehicle is allowed to be the "negative acceleration whose absolute value is large (that is, large deceleration)" achieved when the brake device of the own vehicle is operated.

In contrast, when the predicted cut-in vehicle is detected based solely on the "second target object information obtained by the front-side looking radar device", the detecting accuracy for the predicted cut-in vehicle is relatively low. Thus, the possibility that the predicted cut-in vehicle does not actually cut in is relatively high. Therefore, if the target acceleration for cut-in vehicle is allowed to become the "negative acceleration whose absolute value is large" achieved when the brake device of the own vehicle is operated, a relatively rapid deceleration frequently occurs when the actual cut-in does not occur. This may provide an odd feeling to the driver.

In view of the above, when the predicted cut-in vehicle is detected based solely on the information obtained by the front-side looking radar device, the second calculation means calculates the target acceleration for cut-in vehicle while providing a limitation on the target acceleration for cut-in vehicle in such a manner that the target acceleration for cut-in vehicle does not become smaller than a negative acceleration achieved when a throttle valve opening of an internal combustion engine serving as a driving force of the own vehicle is set at a minimum value. As a result, the own vehicle does not rapidly decelerate due to the predicted cut-in vehicle. Thus, even when the actual cut-in does not actually occur, the driver avoids the odd feeling of rapid deceleration.

In the above description, references used in the following descriptions regarding embodiments are added with parentheses to the elements of the present disclosure, in order to assist in understanding the present disclosure. However, those references should not be used to limit the scope of the invention. Other objects, other features, and accompanying advantages of the present disclosure will be readily understood from the description of embodiments of the present disclosure to be given referring to the following drawings.

DETAILED DESCRIPTION OF THE EMBODIMENTS

Each of vehicle travelling control devices according to the present disclosure will next be described with reference to the drawings. Firstly, main terms used in the present specification and the drawings are described.

The own vehicle: One's own vehicle (subject vehicle that is focused on).
The other vehicle: A vehicle other than the own vehicle.
The proceeding vehicle: The other vehicle traveling immediately ahead of (in front of) the own vehicle.

The objective-forward-vehicle: The proceeding/leading vehicle, which a sensor device (front looking radar device) mounted on the own vehicle detects (acquires), and which the own vehicle should follow up by controlling an acceleration of the own vehicle so as to keep an inter-vehicle distance between the own vehicle and the proceeding vehicle at a predetermined distance.

The cut-in vehicle: The other vehicle which cuts in ahead of the own vehicle by changing lanes.

First Embodiment

Structure

Figure 1:
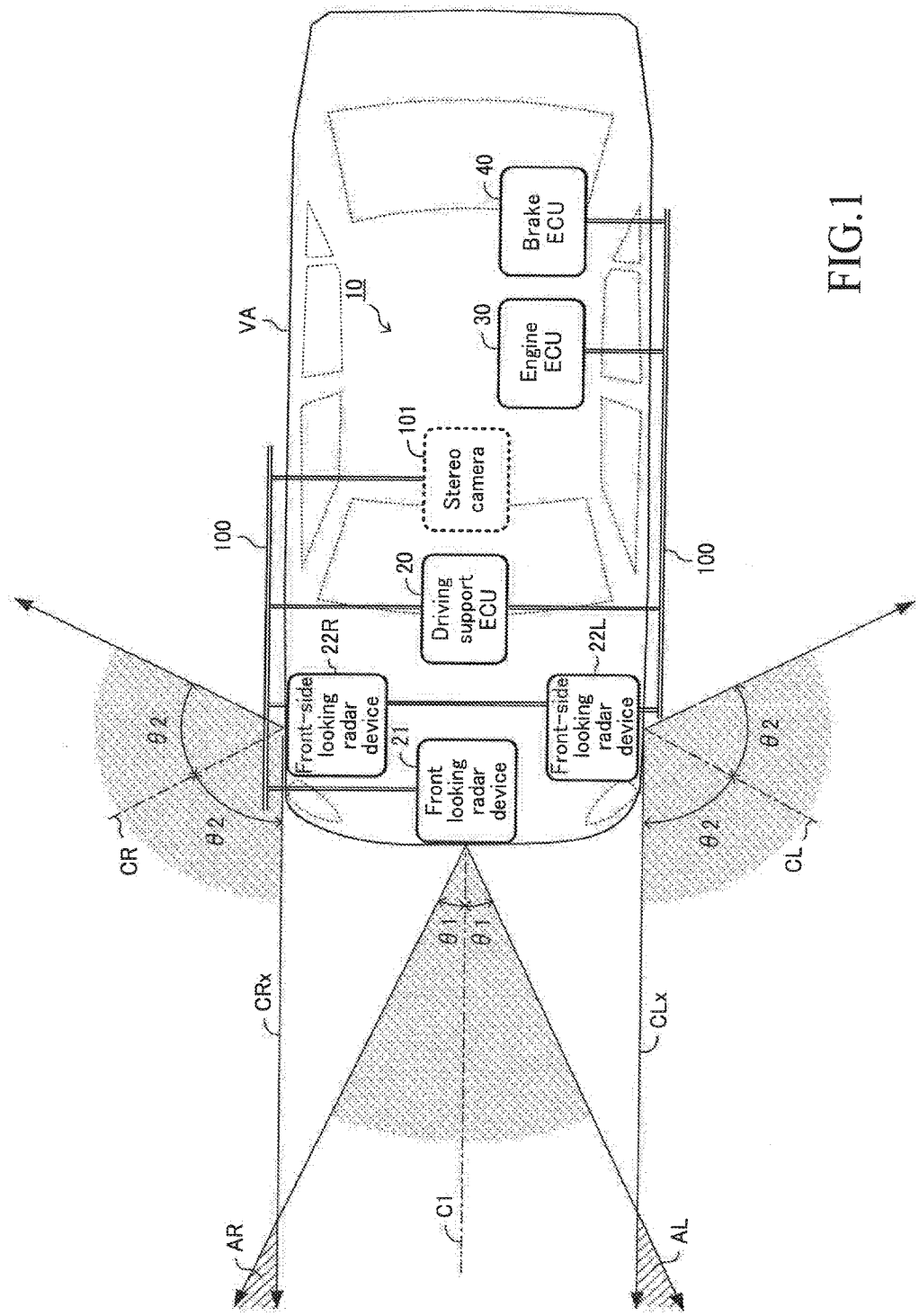
FIG. 1 is a schematic diagram of a vehicle travelling control device according to a first embodiment of the present disclosure.

As shown in FIG. 1, a vehicle travelling control device (hereinafter, sometimes referred to as a "first device") 10 according to a first embodiment of the present disclosure is mounted on (applied to) the own vehicle VA. The first vehicle 10 comprises a driving support (assist) ECU 20, an engine ECU 30, and a brake ECU 40. Those ECUs are capable of exchanging data (communicating with each other) through a communication/sensor CAN (Controller Area Network) 100. It should be noted that an "ECU" is an abbreviation of an electric control unit, and is an electronic control circuit having a microcomputer including a CPU, a ROM, a RAM, an interface, and the like, as a main part. The CPU achieves/realizes various functions described later by executing instructions (routines) stored in the memory (e.g., ROM).

Further, the first device 10 comprises a front looking radar device 21, a front-side looking radar device 22R, and a front-side looking radar device 22L. Those radar devices can also exchange data with the driving support ECU 20 through the CAN 100.

Figure 2:
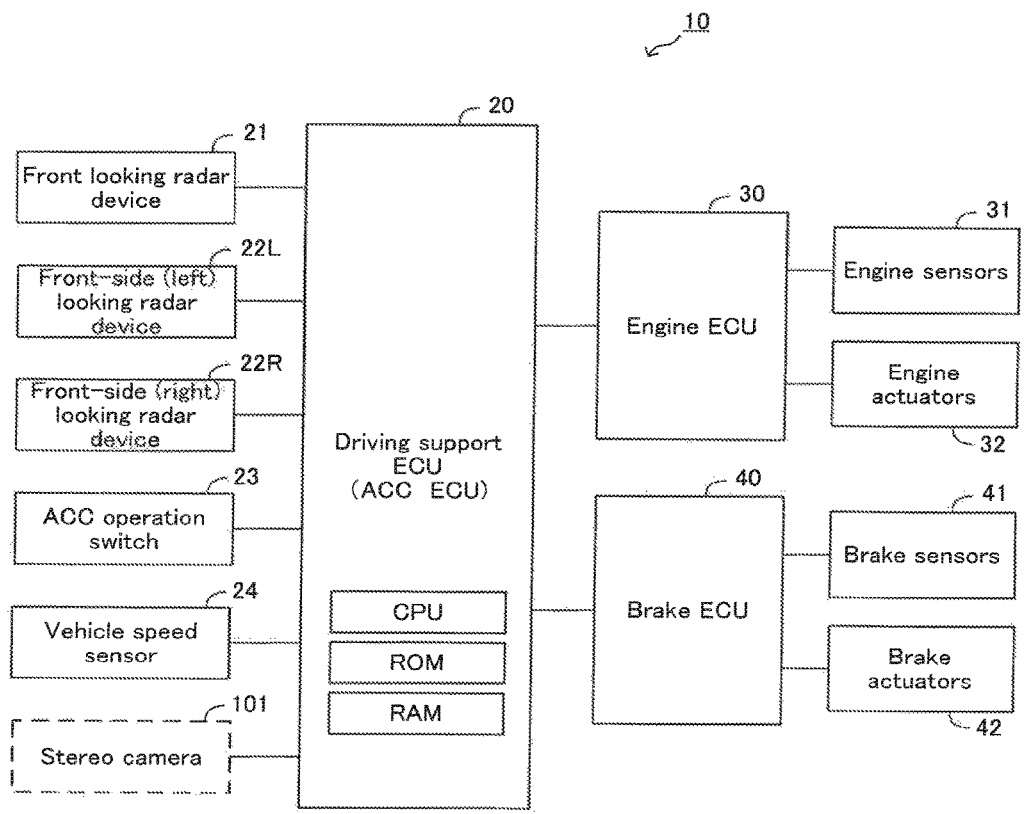
FIG. 2 is a configuration diagram of the vehicle travelling control device shown in FIG. 1.

More specifically, as shown in FIG. 2, the driving support ECU 20 is connected with an ACC operation switch 23, and a vehicle speed sensor 24, in addition to the front looking radar device 21, the front-side looking radar device 22R, and the front-side looking radar device 22L.

The front looking radar device 21 comprises a millimeter wave transmitter-receiver section, and a processing section. As shown in FIG. 1, the front looking radar device 21 is positioned at the front end of the own vehicle VA, and at the center portion of the own vehicle VA in a body width direction. The millimeter wave transmitter-receiver section transmits a millimeter wave which propagates with a center axis C1 extending in a straight forward direction of the own vehicle VA, and spreads with a predetermined angle θ1 in a left direction as well as with the predetermined angle θ1 in a right direction with respect to the center axis C1. The millimeter wave is reflected by a target object (e.g., proceeding vehicle). The millimeter wave transmitter-receiver section receives the reflected wave. It should be noted that, hereinafter, a vehicle going forward direction along the center axis C1 is defined as an "X-axis", and a direction orthogonal to the center axis C1 is defined as a "Y-axis." The X-coordinate is positive in the vehicle's forward direction, and is negative in the vehicle's backward direction. The Y-coordinate is positive in the vehicle's rightward direction, and is negative in the vehicle's leftward direction.

The processing section of the front looking radar device 21 obtains, every elapse of a predetermined time, an inter-vehicle distance (longitudinal distance) Dfx(n), a relative speed Vfx(n), a lateral distance Dfy(n), a relative lateral speed Vfy(n), or the like, with respect to each detected target object (n), based on a phase difference between the transmitted millimeter wave and the received reflected wave, an attenuation level, a time period from the point in time at which the millimeter wave is transmitted to the point in time at which the reflected wave is received, or the like. The data (Dfx(n), Vfx(n), Dfy(n), Vfy(n), etc.) acquired by the front looking radar device 21 are also referred to as "front looking radar obtained information", as a matter of convenience.

The inter-vehicle distance (longitudinal distance) Dfx(n) is a distance along the center axis C1 between the own vehicle VA and the target object(n) (e.g., the proceeding vehicle).

The relative speed Vfx(n) is a difference (=SPDs−SPDj) between a speed SPDs of the target object(n) (e.g., the proceeding vehicle) and a speed SPDj of the own vehicle VA. It should be noted that the speed SPDs of the target object(n) is a speed of the target object (n) in the direction of travel of the own vehicle VA.

The lateral distance Dfy(n) is a distance along the direction orthogonal to the center axis C1 from the center axis C1 to a "center position of the target object (n) (e.g., a center position of a vehicle width of the proceeding vehicle)." The lateral distance Dfy(n) may also be referred to as a "lateral position."

The relative lateral speed Vfy(n) is a speed of the center position of the each target object (n) in the direction orthogonal to the center axis C1.

As shown in FIG. 1, the front-side (left) looking radar device 22L is positioned at a left-and-front side of the vehicle body of the own vehicle VA. The front-side looking radar device 22L has a configuration similar to the configuration of the front looking radar device 21. The millimeter wave transmitter-receiver section of the front-side looking radar device 22L transmits a millimeter wave which propagates with a center axis CL extending in a front-left direction of the own vehicle VA, and spreads with a predetermined angle θ2 in a front direction as well as the predetermined angle θ2 in a rear direction with respect to the center axis CL. One of the border lines (CLx) defining the border of the spreading millimeter wave transmitted from the front-side looking radar device 22L is parallel with the center axis C1.

The processing section of the front-side looking radar device 22L obtains, every elapse of a predetermined time, a longitudinal distance DLx, a relative speed VLx, a lateral distance DLy, a relative lateral speed VLy, or the like, with respect to each detected target object, based on a phase difference between the transmitted millimeter wave and the received reflected wave, an attenuation level, a time period from the point in time at which the millimeter wave is transmitted to the point in time at which the reflected wave is received, or the like. A vertical axis of coordinates of those data is the center axis CL, and a horizontal axis of the coordinates of those data is an axis extending in a direction orthogonal to the center axis CL. Those data (DLx, VLx, DLy, VLy, or the like) obtained by the front-side looking radar device 22L are also referred to as "front-left-side looking radar obtained information", as a matter of convenience. It should be noted that an accuracy of the front-left-side looking radar obtained information is lower than an accuracy of the front looking radar obtained information.

As shown in FIG. 1, the front-side (right) looking radar device 22R is positioned at a right-and-front side of the vehicle body of the own vehicle VA. The front-side looking radar device 22R has a configuration similar to the configuration of the front looking radar device 21 and the front-side looking radar device 22L. The millimeter wave transmitter-receiver section of the front-side looking radar device 22R transmits a millimeter wave which propagates with a center axis CR extending in a front-right direction of the own vehicle VA, and spreads with a predetermined angle θ2 in a front direction as well as the predetermined angle θ2 in a rear direction with respect to the center axis CL. One of the border lines (CRx) defining the border of the spreading millimeter wave transmitted from the front-side looking radar device 22R is parallel with the center axis C1.

The processing section of the front-side looking radar device 22R obtains, every elapse of a predetermined time, a longitudinal distance DRx, a relative speed VRx, a lateral distance DRy, a relative lateral speed VRy, or the like, with respect to each detected target object, based on a phase difference between the transmitted millimeter wave and the received reflected wave, an attenuation level, a time period from the point in time at which the millimeter wave is transmitted to the point in time at which the reflected wave is received, or the like. A vertical axis of coordinates of those data is the center axis CR, and a horizontal axis of the coordinates of those data is an axis extending in a direction orthogonal to the center axis CR. Those data (DRx, VRx, DRy, VRy, or the like) obtained by the front-side looking radar device 22R are also referred to as "front-right-side looking radar obtained information", as a matter of convenience. It should be noted that an accuracy of the front-right-side looking radar obtained information is the same as the accuracy of the front-left-side looking radar obtained information, and is lower than the accuracy of the front looking radar obtained information.

As is clear from FIG. 1, the detection area of the front looking radar device 21 and the detection area of the front-side looking radar device 22L have a portion (overlap area AL) that overlaps with each other, and the detection area of the front looking radar device 21 and the detection area of the front-side looking radar device 22R have a portion (overlap area AR) that overlaps with each other. In other words, a target object within the overlap area AL is detected/captured by both of the front looking radar device 21 and the front-side looking radar device 22L, and a target object within the overlap area AR is detected/captured by both of the front looking radar device 21 and the front-side looking radar device 22R.

Referring back to FIG. 2 again, the ACC operation switch 23 is a switch operated by a driver. The term "ACC" means an inter-vehicle distance control (Adaptive Cruise Control), and may also be simply referred to as a "trailing travel control." When the driver performs a certain operation using the ACC operation switch 23, an ACC start request (including an ACC resume request) and an ACC termination request (cancel request) are generated according to the operation. Further, according to a certain operation using the ACC operation switch 23, a target inter-vehicle time Ttgt described later is set or changed.

The vehicle speed sensor 24 detects a speed (own vehicle speed) Vj of the own vehicle VA, and generates a signal indicative of the own vehicle speed Vj.

The engine ECU 30 is connected with a plurality of engine sensors 31 to receive detected signals from those sensors. The engine sensors 31 are sensors that detect various operation state parameters of an unillustrated own vehicle's "gasoline fuel injection type/spark ignition/internal combustion engine." The engine sensors 31 include an acceleration pedal operation amount sensor, a throttle valve opening sensor, an engine rotational speed sensor, an intake air-flow sensor, or the like.

Further, the engine ECU is connected with engine actuators 32 including a throttle valve actuator, fuel injectors, or the like. The engine ECU 30 drives the engine actuators 32 to change a torque generated by the internal combustion engine, and thereby, adjusting a driving force of the own vehicle so as to control an acceleration of the own vehicle VA. In addition, the engine ECU 30 performs a "fuel-cut operation" to stop a fuel injection, when the throttle valve opening degree detected by the throttle valve opening sensor is "0 (or the minimum value within a range that the throttle valve opening can become)" (namely, the throttle valve is fully-closed) and the engine rotational speed is higher than an engine rotational speed threshold.

The brake ECU 40 is connected with a plurality of brake sensors 41 to receive detected signals from those sensors. The brake sensors 41 are sensors that detect various parameters used for controlling an unillustrated "brake device (hydraulic type friction brake device) of the own vehicle VA." The brake sensors 41 include a brake pedal operation amount sensor, a wheel rotational speed sensor detecting a rotational speed of each wheel, or the like.

Further, the brake ECU 40 is connected with brake actuators 42. The brake actuators 42 are actuators for controlling pressure of brake oil. The brake actuators 42 are positioned in an unillustrated hydraulic circuit between an unillustrated master cylinder for pressurizing the brake oil according to a brake pedal force and unillustrated friction brake devices including well-known wheel cylinders provided to wheels. The brake actuators 42 adjust the pressure of the brake oil supplied to the wheel cylinders. The brake ECU 40 drives the brake actuators 42 to generate a brake force (friction brake force) at each of the wheels, to thereby control/adjust the acceleration (negative acceleration, that is, deceleration) of the own vehicle VA.

(Outline of Operation)

The first device specifies a objective-forward-vehicle based on the target object information obtained by the front looking radar device 21, and calculates a target acceleration G1tgt for trailing travel, required to keep a first set inter-vehicle distance with respect to the objective-forward-vehicle.

Further, when the front looking radar device 21 and the front-side looking radar device 22L or 22R detect the same (identical) target object, the first device integrates/merges the target object information detected by the front looking radar device 21 and the target object information detected by the front-side looking radar device 22L or 22R, and determines whether or not there is a predicted cut-in vehicle based on the integrated/merged target object information. Thereafter, when the first device determines that there is the predicted cut-in vehicle, it calculates a target acceleration G2tgt for cut-in vehicle, required to keep a second set inter-vehicle distance with respect to that predicted cut-in vehicle.

Furthermore, when one of the front-side looking radar device 22L and the front-side looking radar device 22R detects the target object, but the front looking radar device 21 does not detect that target object, the first device determines whether or not there is a predicted cut-in vehicle based on the target object information detected by one of the front-side looking radar device 22L and the front-side looking radar device 22R. Thereafter, when the first device determines that there is the predicted cut-in vehicle, it calculates a target acceleration G3tgt for cut-in vehicle, required to keep a third set inter-vehicle distance with respect to that predicted cut-in vehicle.

In addition, the first device selects a minimum (the smallest) target acceleration among the target acceleration G1tgt for trailing travel, the target acceleration G2tgt for cut-in vehicle, and the target acceleration G3tgt for cut-in vehicle (i.e., selects one of G1tgt, G2tgt, and G3tgt, whichever smallest), and sets the selected target acceleration, as a "final target acceleration (mediated/adjusted target acceleration) Gfin." Thereafter, the first device controls (drives) the engine actuators 32 and the brake actuators 42 in such a manner that the actual acceleration of the own vehicle VA becomes equal to the mediated target acceleration Gfin. As a result, the actual acceleration of the own vehicle VA is made to become equal to the mediated target acceleration Gfin.

(Specific Operation)

The CPU of the driving support ECU 20 (hereinafter, a "CPU" indicates/means the CPU of the driving support ECU 20, unless otherwise noted) executes routines shown in the flowcharts illustrated in FIGS. 4-7, every elapse of a predetermined time, when the ACC start request is generated by the operation using the ACC operation switch 23 while/when the trailing inter-vehicle distance control is not being performed.

1. Calculation of the Target Acceleration for Trailing Travel

Figure 3:
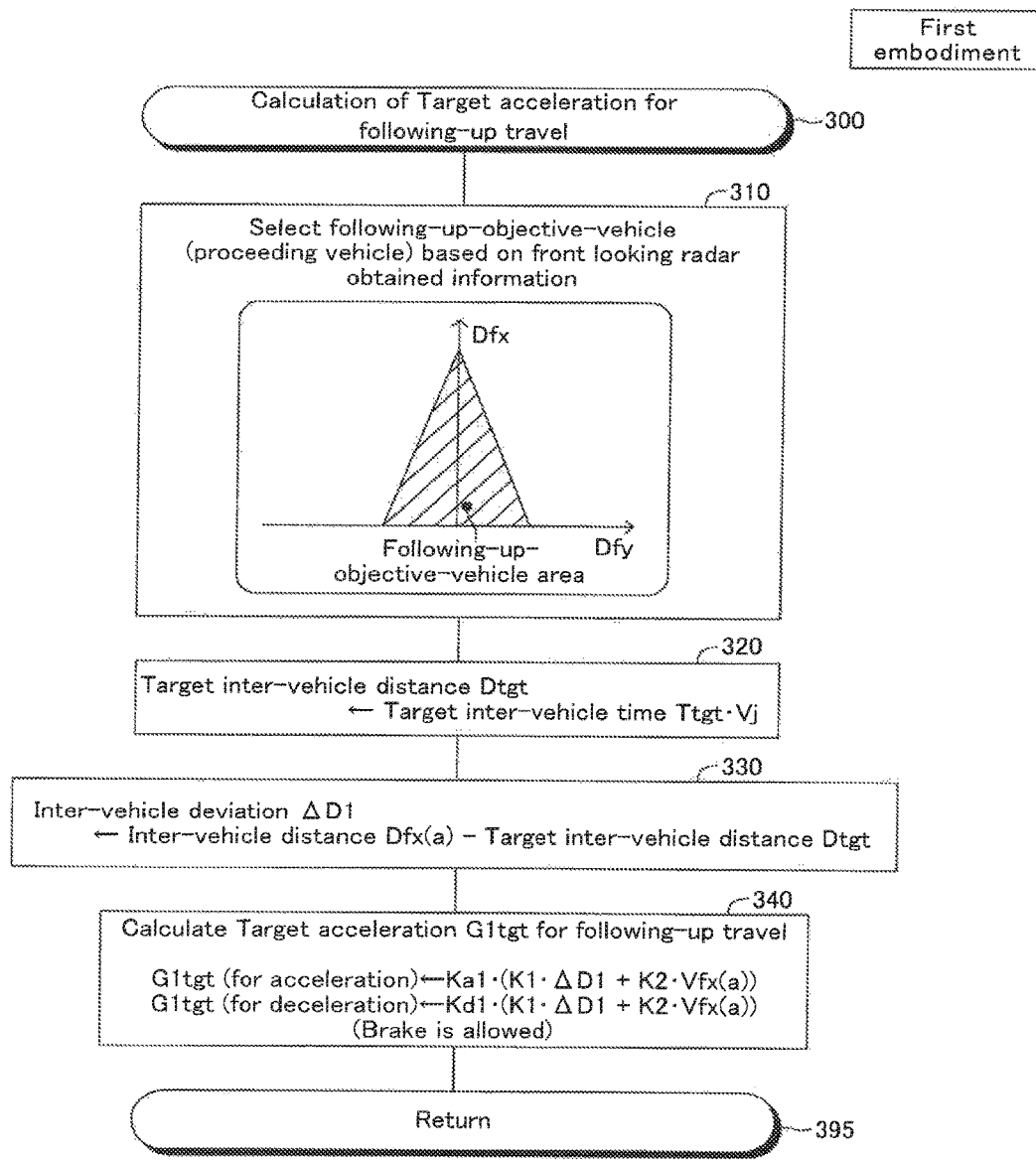
FIG. 3 is a flowchart showing a routine executed by a CPU of the driving support ECU shown in FIG. 2.

Therefore, at an appropriate point in time, the CPU starts processing from step 300 shown in FIG. 3 to execute processes from step 310 to step 340 described below in this order, and then, proceeds to step 395 so as to end the present routine tentatively. The routine shown in FIG. 3 is a routine for calculating the target acceleration for trailing travel.

Step 310: The CPU selects/specifies the objective-forward-vehicle based on the front looking radar obtained information. More specifically, the CPU applies the lateral distance Dfy(n) and the inter-vehicle distance Dfx(n) to a map (look-up table) shown in a block of step 310 so as to select/specify, as the objective-forward-vehicle (a), the other vehicle (n) existing in an objective-forward-vehicle area defined by the map. It should be noted that, if there are a plurality of the other vehicles in the objective-forward-vehicle area, the CPU specifies one of the other vehicles, that has the shortest inter-vehicle distance Dfx(n), as the objective-forward-vehicle. Further, if there is no objective-forward-vehicle, the CPU controls the acceleration of the own vehicle VA in such a manner that the speed of the own vehicle VA becomes equal to a target speed depending on (according to) the target inter-vehicle time Ttgt. This point does not directly relate to the present disclosure, and thus, is not described in detail.

Step 320: The CPU calculates the target inter-vehicle distance Dtgt by multiplying the target inter-vehicle time Ttgt by the speed Vj of the own vehicle. The target inter-vehicle time Ttgt is separately set based on the operation of the ACC operation switch 23, however, it may be constant. It should be noted that the target inter-vehicle distance Dtgt obtained at step 320 is also referred to as a "first set inter-vehicle distance."

Step 330: The CPU calculates an inter-vehicle deviation (difference) ΔD1 by subtracting the target inter-vehicle distance Dtgt from the inter-vehicle distance Dfx(a) of the objective-forward-vehicle (a) selected/specified at step 310.

Step 340: The CPU calculates the target acceleration G1tgt for trailing travel using either one of a formula (1) described below and a formula (2) described below. The target acceleration G1tgt for trailing travel is also referred to as a "first target acceleration", as a matter of convenience.

In the formulas (1) and (2), the Vfx(a) is the relative speed of the objective-forward-vehicle (a) selected/specified at step 310, and K1 and K2 are predetermined positive gains (coefficients). The CPU uses the formula (1) below when a value (K1·ΔD1+K2·Vfx(a)) is positive. Ka1 is a positive gain (coefficient) for acceleration, and set to a value equal to or smaller than "1.". The CPU uses the formula (2) below when a value (K1·ΔD1+K2·Vfx(a)) is negative. Kd1 is a gain (coefficient) for deceleration, and set to "1" in the present example.

$$G1tgt(\text{for acceleration})=Ka1\cdot(K1\cdot\Delta D1+K2\cdot Vfx(a)) \quad (1)$$

$$G1tgt(\text{for deceleration})=Kd1\cdot(K1\cdot\Delta D1+K2\cdot Vfx(a)) \quad (2)$$

The target acceleration G1tgt for deceleration calculated based on the formula (2) above is calculated in such a manner that the target acceleration G1tgt is allowed to be an acceleration (negative acceleration) realized/achieved when the brake device of the own vehicle VA is operated (in other words, the target acceleration G1tgt may be a value obtained under a condition that it is allowed to be a negative acceleration realized/achieved when the brake device is operated). In the above manner, the target acceleration G1tgt for trailing travel based solely/only on the front looking radar obtained information is acquired.

2. Calculation of the Target Acceleration for Cut-in Vehicle

Figure 4:
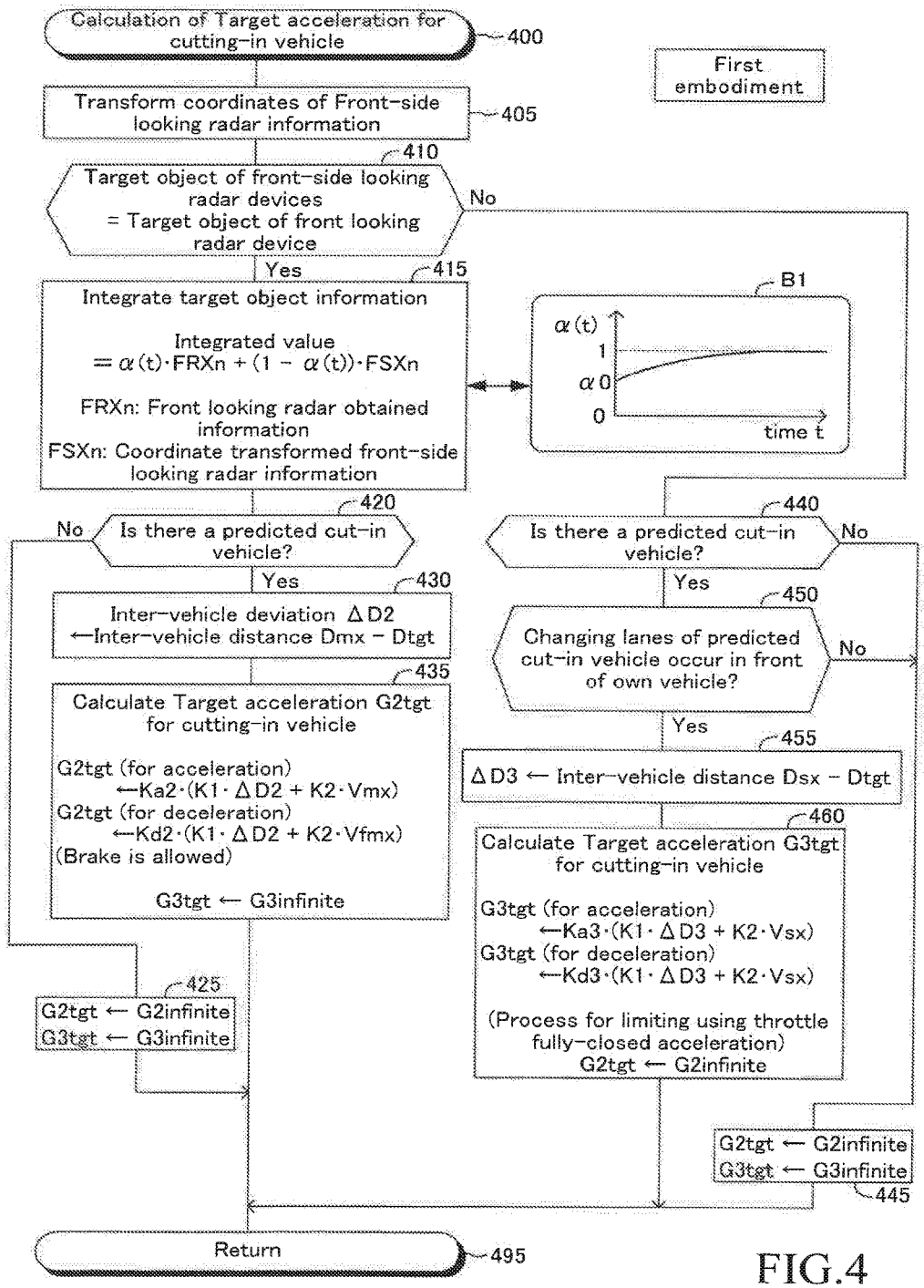
FIG. 4 is a flowchart showing a routine executed by the CPU of the driving support ECU shown in FIG. 2.

Further, at an appropriate point in time, the CPU starts processing from step 400 in a "routine for calculation of the target acceleration for cut-in vehicle" shown in FIG. 4 to proceed to step 405. At step 405, the CPU transforms coordinates concerning the position of the target object and the relative speed, obtained by the front-side looking radar device 22L and the front-side looking radar device 22R (that is, the front-left-side looking radar obtained information, and the front-right-side looking radar obtained information) to the "X-Y coordinates of the front looking radar device 21." Consequently, the "coordinate transformed front-side looking radar information FSXn", including an inter-vehicle distance Dsx, a relative speed Vsx, a lateral distance Dsy, and a relative lateral speed Vsy, is obtained.

Subsequently, the CPU proceeds to step 410 to compare the front looking radar obtained information FRXn with/to the coordinate transformed front-side looking radar information FSXn in order to determine whether or not there is a "target object which at least one of the front-side looking radar device 22L and the front-side looking radar device 22R detects" among the target objects which the front looking radar device 21 detects and which are different from (other than) the objective-forward-vehicle (a).

When the determination at step 410 is positive (affirmative), the CPU proceeds to step 415 at which the CPU integrates/merges the target object information according to a formula (3) described below. That is, at step 415, the CPU obtains integrated target object information. α(t) in the formula (3) described below is a filtering coefficient (weighting coefficient), and is obtained by applying a time t to a look up table Mapα(t) shown in a block B1 in FIG. 4. The time t is an elapsed time from a point in time at which the front looking radar device 21 starts to detect the "target object" which either one of the front-side looking radar device 22L and the front-side looking radar device 22R has been detecting. According to the table Mapα(t), α(t) is obtained as a value which gradually becomes closer to "1" from a value α0 between "0" and "1" as the elapsed time t becomes longer. It should be noted that α(t) may be a constant value between "0" and "1", which does not change depending upon the elapsed time t.

$$\text{Integrated value}=\alpha(t)\cdot FRXn+(1-\alpha(t))\cdot FSXn \quad (3)$$

The front looking radar obtained information FRXn in the formula (3) above includes "an inter-vehicle distance Dfx (b), a relative speed Vfx(b), a lateral distance Dfy(b), and a relative lateral speed Vfy(b)" concerning the "target object (hereinafter, referred to as a "common target object (b)")

which was determined at step 410 to be detected by not only the front looking radar device 21 but also either one of the front-side looking radar device 22L and the front-side looking radar device 22R. The coordinate transformed front-side looking radar information FSXn in the formula (3) above includes "a coordinate transformed inter-vehicle distance Dsx, a coordinate transformed relative speed Vsx, a coordinate transformed lateral distance Dsy, and a coordinate transformed relative lateral speed Vsy" concerning the common target object (b). Accordingly, as shown in formulas from (4) to (7) described below, "an integrated inter-vehicle distance Dmx, an integrated relative speed Vmx, an integrated lateral distance Dmy, and an integrated relative lateral speed Vmy" serving as the integrated values are obtained.

$$Dmx = \alpha(t) \cdot Dfx(b) + (1 - \alpha(t)) \cdot Dsx \quad (4)$$

$$Vmx = \alpha(t) \cdot Vfx(b) + (1 - \alpha(t)) \cdot Vsx \quad (5)$$

$$Dmy = \alpha(t) \cdot Dfy(b) + (1 - \alpha(t)) \cdot Dsy \quad (6)$$

$$Vmy = \alpha(t) \cdot Vfy(b) + (1 - \alpha(t)) \cdot Vsy \quad (7)$$

Subsequently, the CPU proceeds to step 420 to determine whether or not the there is a predicted cut-in vehicle (i.e., whether or not a vehicle which is predicted to cut in exists). More specifically, the CPU obtains a cut-in event probability P by applying "the integrated lateral distance Dmy and the integrated relative speed Vmy" to an area map WS shown in FIG. 5.

Figure 5:
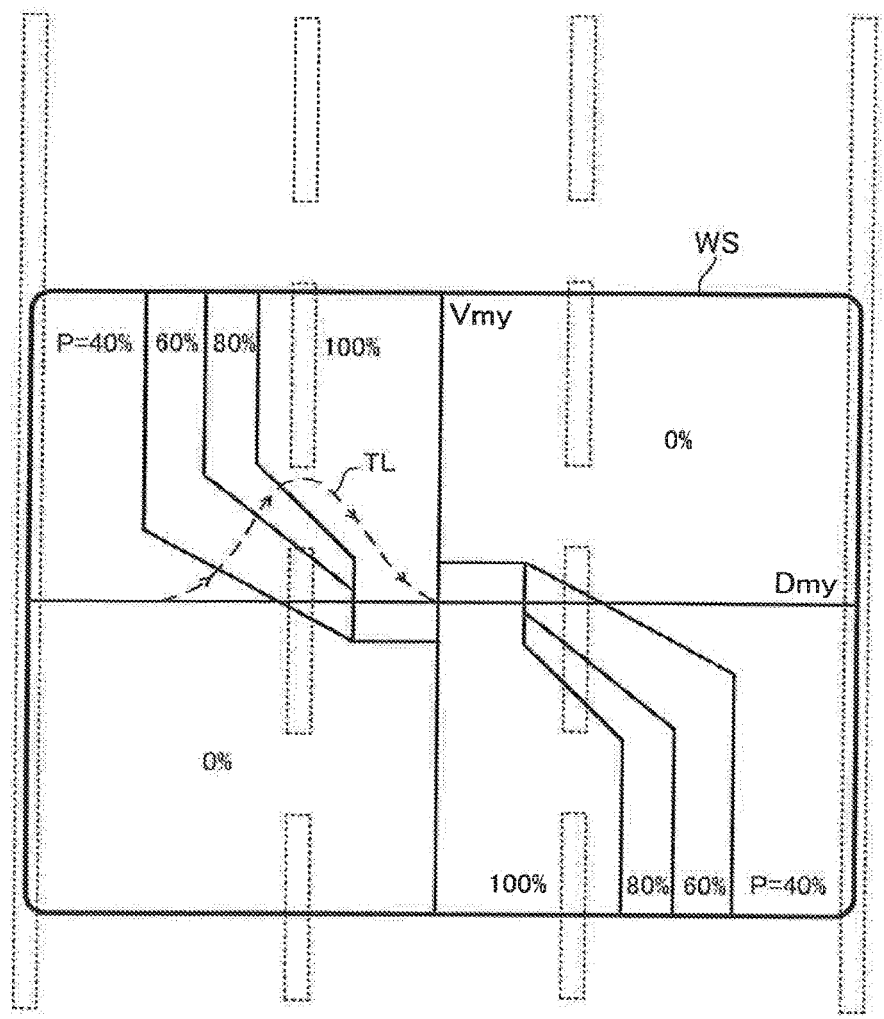
FIG. 5 is a look-up table (map) which the CPU of the driving support ECU shown in FIG. 2 refers to in order to detect a predicted cut-in vehicle.

For example, when a vehicle traveling in front and diagonally to the left of the own vehicle VA cuts in between the own vehicle VA and the objective-forward-vehicle (a), a trajectory (locus) of a point defined by the integrated lateral distance Dmy and the integrated relative lateral speed Vmy changes as shown by a broken line TL in FIG. 5. The area map WS is made in consideration of such trajectories, and is stored in the ROM beforehand. Generally speaking, the cut-in event probability P obtained using the area map WS becomes higher as an magnitude of the integrated lateral distance Dmy becomes closer to "0", and becomes higher as a magnitude |Vmy| of the integrated relative lateral speed Vmy becomes larger when the integrated relative lateral speed Vmy is a value indicating that the vehicle is approaching the center portion of the width of the own vehicle.

The CPU determines that there is the "predicted cut-in vehicle", when the CPU determines that the cut-in event probability P obtained using the area map WS is equal to or higher than a predetermined value (e.g., 60%). That is, the CPU specifies that target object as the predicted cut-in vehicle.

When it is determined that there is the predicted cut-in vehicle, the CPU makes a "Yes" determination at step 420 to execute processes of step 430 and step 435 described below in this order, and then, proceeds to step 495 so as to end the present routine tentatively.

Step 430: The CPU calculates an inter-vehicle deviation (difference) ΔD2 by subtracting the target inter-vehicle distance Dtgt from the integrated inter-vehicle distance Dmx. It should be noted that the target inter-vehicle distance Dtgt used at step 430 is referred to as a "second set inter-vehicle distance", as a matter of convenience. The second set inter-vehicle distance may be the same as the first set inter-vehicle distance, or may be a value which becomes closer to the first set inter-vehicle distance from a value smaller than the first set inter-vehicle distance by a positive first value as an "elapsed time t from a point in time at which it was determined that there was the predicted cut-in vehicle" becomes longer. In this case, the target inter-vehicle time for calculating the second set inter-vehicle distance may be a time obtained by multiplying the "target inter-vehicle time Ttgt used when the first set inter-vehicle distance is calculated" by a "coefficient s(t)" which comes closer to and converges on "1" from a value between "0" and "1" as the above mentioned time t becomes longer.

Step 435: The CPU calculates the target acceleration G2tgt for cut-in vehicle according to either one of a formula (8) and a formula (9) described below. The target acceleration G2tgt for cut-in vehicle is referred to as a "second target acceleration", as a matter of convenience. Further, the CPU sets a target acceleration G3tgt for cut-in vehicle described later at an "imaginary acceleration G3infinite" which is larger than a maximum acceleration that the own vehicle VA can realize.

In the formula (8) and the formula (9), Vmx is the integrated relative speed of the target object which was determined to be the predicted cut-in vehicle at step 420, and "K1, and K2" are the same gains as the "K1, and K2" used in the formula (1) and the formula (2), respectively. The CPU uses the formula (8) below when a value (K1·ΔD2 + K2·Vmx) is positive.

Ka2 is a positive gain (coefficient) for acceleration, and set at a value smaller than the gain Ka1 used in the formula (1) above.

The CPU uses the formula (9) below when the value (K1·ΔD2 + K2·Vmx) is negative.

Kd2 is a positive gain (coefficient) for deceleration, and set at a value smaller than the gain Kd1 used in the formula (2) above.

$$G2tgt(\text{for acceleration}) = Ka2 \cdot (K1 \cdot \Delta D2 + K2 \cdot Vmx) \quad (8)$$

$$G2tgt(\text{for deceleration}) = Kd2 \cdot (K1 \cdot \Delta D2 + K2 \cdot Vmx) \quad (9)$$

The target acceleration G2tgt for cut-in vehicle for deceleration calculated based on the formula (9) above is calculated in such a manner that the target acceleration G2tgt is allowed to be an acceleration (negative acceleration) realized/achieved when the brake device of the own vehicle VA is operated, similarly to the target acceleration G1tgt for trailing travel. In other words, the target acceleration G2tgt for cut-in vehicle may become a value obtained under the condition that it is allowed to be a negative acceleration realized/achieved when the brake device is operated. In the above manner, the target acceleration G2tgt for cut-in vehicle is calculated based on the integrated/merged information (integrated values) obtained by integrating the front looking radar obtained information and the coordinate transformed front-side looking radar information.

In contrast, when the CPU determines that there is no predicted cut-in vehicle upon the execution of step 420, the CPU makes a "No" determination at step 420 to proceed to step 425, at which the CPU sets the target acceleration G2tgt for cut-in vehicle at an "imaginary acceleration G2infinite" which is larger than the maximum acceleration that the own vehicle VA can realize, and sets the target acceleration G3tgt for cut-in vehicle described later at the "imaginary acceleration G3infinite" which is larger than the maximum acceleration that the own vehicle VA can realize. Thereafter, the CPU proceeds to step 495 to end the present routine tentatively.

On the other hand, when the determination at step 410 is negative (unaffirmative), the CPU makes a "No" determination. Then, the CPU proceeds to step 440, at which the CPU determines whether or not there is a predicted cut-in vehicle. In this case, the CPU obtains the cut-in event probability P by applying "the coordinate transformed lateral distance Dsy in place of the integrated lateral distance Dmy, and the coordinate transformed relative lateral speed Vsy in place of the integrated relative speed Vmy" to the area map WS shown in FIG. 5. Thereafter, the CPU determines that there is the "predicted cut-in vehicle", when the cut-in event probability P is equal to or larger than the predetermined value (e.g., 60%), similarly to step 420. That is, the CPU specifies that target object as the predicted cut-in vehicle.

When it is determined that there is the predicted cut-in vehicle, the CPU makes a "Yes" determination at step 440 to proceed to step 450, at which the CPU determines whether or not a lane change (changing lanes) of the predicted cut-in vehicle occurs in front of the own vehicle VA.

Figure 6A:
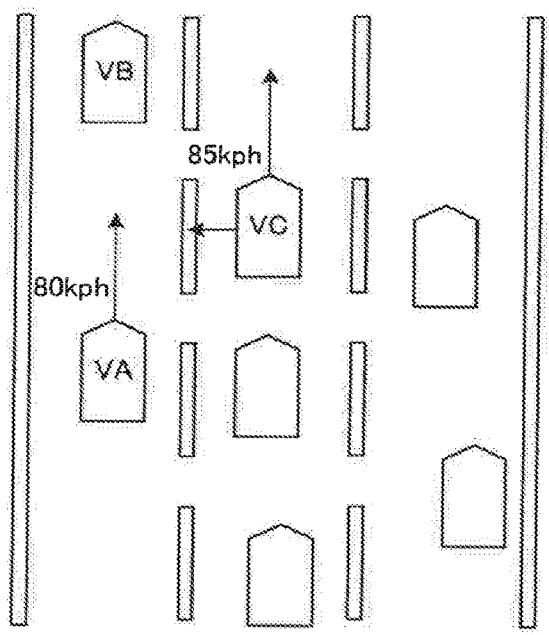
FIG. 6 (A) is a view schematically showing a scene when the other vehicle changes lanes, and FIG. 6 (B) is a view schematically showing another scene when the other vehicle changes lanes.
Figure 6B:
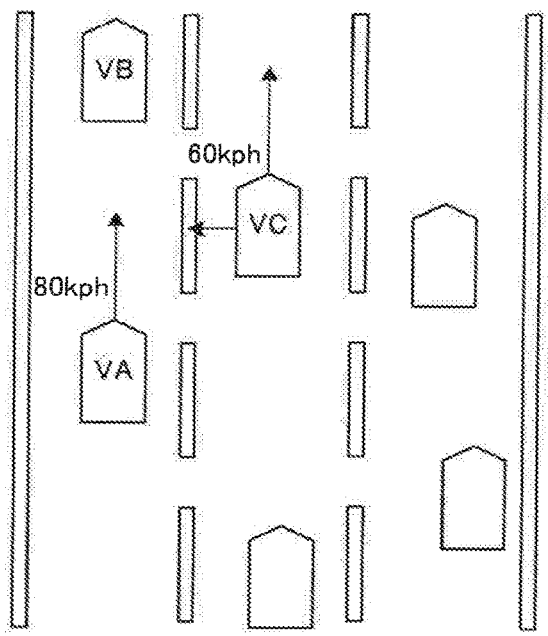

For example, as shown in (A) of FIG. 6, when the vehicle VC is cutting in while the own vehicle VA is following the objective-forward-vehicle VB, it is determined that the vehicle VC is the predicted cut-in vehicle. In this case, if the speed Vj of the own vehicle VA is 80 km/h, and the speed of the predicted cut-in vehicle VC is 85 km/h, it is likely that the predicted cut-in vehicle VC will cut in between the own vehicle VA and the objective-forward-vehicle VB.

In contrast, as shown in (B) of FIG. 6, when the own vehicle VA is following (i.e., trailing) the objective-forward-vehicle VB at 80 km/h, and the speed of the predicted cut-in vehicle VC is 60 km/h, it is likely that the predicted cut-in vehicle VC will change lanes to travel behind the own vehicle VA, after the own vehicle VA passes the predicted cut-in vehicle VC.

Step 450 is for determining which situation is occurring, the situation shown in (A) of FIG. 6, or the situation shown in (B) of FIG. 6. More specifically, the CPU determines whether or not the coordinate transformed relative speed Vsx is equal to or higher than a predetermined threshold Vth so as to determine whether or not the changing lanes of the predicted cut-in vehicle occurs in front of the own vehicle VA. It should be noted the predetermined threshold Vth may be set at a value larger than a negative certain value.

When it is determined that the changing lanes of the predicted cut-in vehicle occurs in front of the own vehicle VA (i.e., when it is determined that the coordinate transformed relative speed Vsx is equal to or higher than the predetermined threshold Vth), the CPU makes a "Yes" determination at step 450 to execute processes of step 455 and step 460 described below in this order, and then, proceeds to step 495 so as to end the present routine tentatively.

Step 455: The CPU calculates an inter-vehicle deviation (difference) ΔD3 by subtracting the target inter-vehicle distance Dtgt from the coordinate transformed inter-vehicle distance Dsx. It should be noted that the target inter-vehicle distance Dtgt used at step 455 is referred to as a "third set inter-vehicle distance", as a matter of convenience. The third set inter-vehicle distance may be the same as the second set inter-vehicle distance, or may be a value which becomes closer to the first set inter-vehicle distance from a value smaller than the second set inter-vehicle distance by a positive first value as the "elapsed time t from the point in time at which it was determined that there was the predicted cut-in vehicle" becomes longer. In this case, the target inter-vehicle time for calculating the third set inter-vehicle distance may be a time obtained by multiplying the "target inter-vehicle time Ttgt used when the first set inter-vehicle distance is calculated" by a "coefficient u(t)" which comes closer to and converges on "1" from a value between "0" and "1" and smaller than the coefficient s(t)=s(0) as the above mentioned time t becomes longer. It should be noted that the coefficient u(t) is adjusted so as to be equal to or smaller than the coefficient s(t).

Step 460: The CPU calculates the target acceleration G3tgt for cut-in vehicle according to either one of a formula (10) and a formula (11) described below. The target acceleration G3tgt for cut-in vehicle is referred to as a "third target acceleration", as a matter of convenience. Further, the CPU sets the target acceleration G2tgt for cut-in vehicle at the "imaginary acceleration G2infinite" which is larger than the maximum acceleration that the own vehicle VA can realize.

In the formula (10) and the formula (11), Vsx is the coordinate transformed relative speed of the target object which was determined to be the predicted cut-in vehicle at step 440, and "K1, and K2" are the same gains as the "K1, and K2" used in the formula (1) and the formula (2), respectively. The CPU uses the formula (10) below when a value (K1·ΔD3+K2·Vsx) is positive.

Ka3 is a positive gain (coefficient) for acceleration, and set at a value smaller than (or equal to) the gain Ka2 used in the formula (8) above.

The CPU uses the formula (1) below when the value (K1·ΔD3+K2·Vsx) is negative.

Kd3 is a positive gain (coefficient) for deceleration, and set at a value smaller than (or equal to) the gain Kd2 used in the formula (9) above.

$$G3tgt\text{(for acceleration)} = Ka3 \cdot (K1 \cdot \Delta D3 + K2 \cdot Vsx) \tag{10}$$

$$G3tgt\text{(for deceleration)} = Kd3 \cdot (K1 \cdot \Delta D3 + K2 \cdot Vsx) \tag{11}$$

Note that G3tgt is limited so as to be larger than an acceleration (G@TA=0) obtained when the throttle valve opening TA is equal to 0 (G3tgt≤G@TA=0).

The target acceleration G3tgt for cut-in vehicle for deceleration calculated based on the formula (11) above is limited so as not to be equal to or smaller than an acceleration (negative acceleration) G@TA=0 realized/achieved when the throttle valve opening of the internal combustion engine is "0 (or the minimum value within a range that the throttle valve opening can become)" (namely, the throttle valve is fully-closed) while the brake device of the own vehicle VA is not operated. That is, a process for limiting with a lower limit that is the throttle valve fully closed acceleration G@TA=0 on the target acceleration G3tgt for cut-in vehicle is performed. The throttle valve fully closed acceleration G@TA=0 may be said to be a minimum acceleration which the own vehicle VA can realize/achieve without operating the brake device of the own vehicle VA.

More specifically, at step 460, the CPU calculates the target acceleration G3tgt for cut-in vehicle according to either the above formula (10) or the above formula (11). The CPU sets the thus calculated target acceleration G3tgt for cut-in vehicle at the throttle valve fully closed acceleration G@TA=0 if the thus calculated target acceleration G3tgt is smaller than the throttle valve fully closed acceleration G@TA=0. It should be noted that the CPU separately calculates the throttle valve fully closed acceleration G@TA=0 based on the engine rotational speed NE and a gear position of an unillustrated transmission of the own vehicle VA on the assumption that the CPU operates the internal combustion engine under the fuel cut state when the throttle valve opening is "0." In this manner, the target acceleration G3tgt for cut-in vehicle is obtained based solely/only on the (coordinate transformed) front-side looking radar information.

In contrast, when the CPU makes a "No" determination at either step 440 or step 450, the CPU proceeds to step 445. The CPU sets the target acceleration G2tgt for cut-in vehicle at the "imaginary acceleration G2infinite" which is larger than the maximum acceleration that the own vehicle VA can realize, and sets the target acceleration G3tgt for cut-in vehicle at the "imaginary acceleration G3infinite" which is larger than the maximum acceleration that the own vehicle VA can realize. Thereafter, the CPU proceeds to step 495 to end the present routine tentatively.

3. Mediation/Adjustment of Target Acceleration and Vehicle Travel Control

Figure 7:
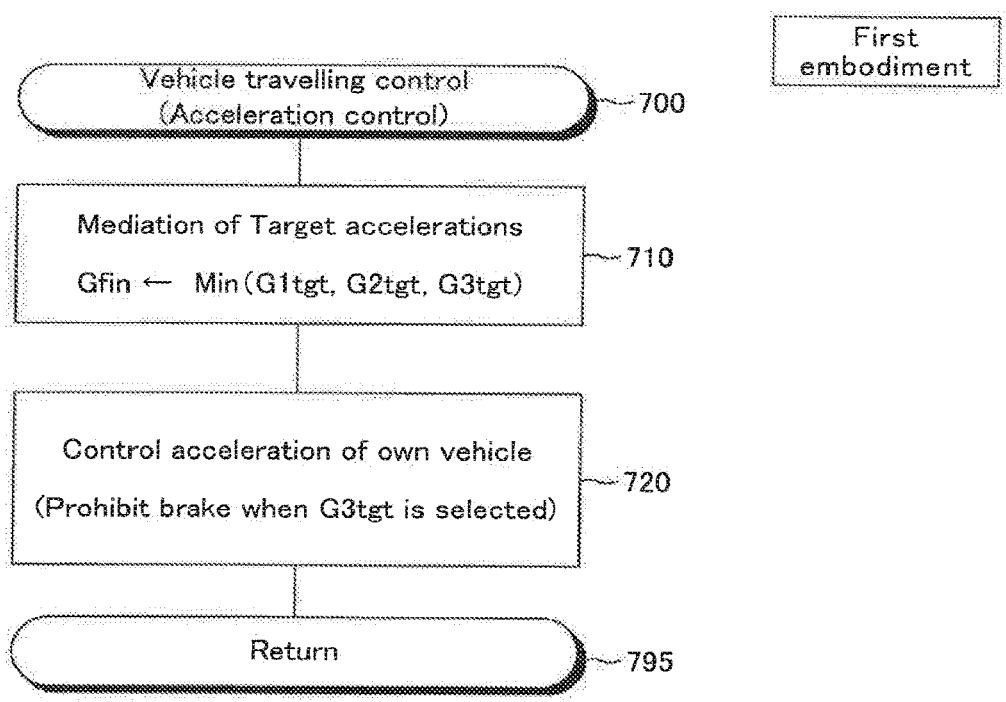
FIG. 7 is a flowchart showing a routine executed by the CPU of the driving support ECU shown in FIG. 2.

At an appropriate point in time, the CPU starts processing from step 700 of a "routine for mediation of target acceleration and vehicle travel control" shown in FIG. 7, to execute processes of step 710 and step 720 in this order, and proceeds to step 795 to end the present routine tentatively.

Step 710: The CPU selects one of the target acceleration G1tgt for trailing travel, the target acceleration G2tgt for cut-in vehicle, and the target acceleration G3tgt for cut-in vehicle, whichever is smallest, and sets the selected target acceleration as the "final target acceleration (mediated/adjusted target acceleration) Gfin." That is, the CPU mediates among three kinds of target accelerations. In other words, when the target acceleration G2tgt for cut-in vehicle, and the target acceleration G3tgt for cut-in vehicle are considered to be a single target acceleration for cut-in vehicle, the CPU selects either the target acceleration for trailing travel or the target acceleration for cut-in vehicle, whichever is smaller, as the mediated target acceleration Gfin.

Step 720: The CPU sends the mediated target acceleration Gfin to the engine ECU 30 and the brake ECU 40 in order to make the acceleration of the own vehicle VA become equal to the mediated target acceleration Gfin. The engine ECU 30 and the brake ECU 40 control (drive) the engine actuators 32 and the brake actuators 42, respectively, based on the mediated target acceleration Gfin. As a result, the actual acceleration of the own vehicle VA is made to become equal to the mediated target acceleration Gfin. In this manner, the trailing inter-vehicle distance control is performed.

As described above, the first device calculates the target acceleration G1tgt for trailing travel, the target acceleration G2tgt for cut-in vehicle, and the target acceleration G3tgt for cut-in vehicle, and sets the minimum (the smallest) target acceleration among them, as the "final target acceleration (mediated/adjusted target acceleration) Gfin."

Accordingly, when the target acceleration (one of G2tgt and G3tgt) for cut-in vehicle is selected as the mediated target acceleration Gfin in a case where the predicted cut-in vehicle is detected, the own vehicle VA decelerates so as to increase the inter-vehicle distance between the own vehicle VA and the objective-forward-vehicle. Thus, when the predicted cut-in vehicle actually cuts in, the inter-vehicle distance with respect to the cut-in vehicle (i.e., distance between the own vehicle VA and the predicted cut-in vehicle that is now an actual cut-in vehicle) becomes appropriate in a short time. In addition, if the objective-forward-vehicle starts to rapidly decelerate after a point in time at which the predicted cut-in vehicle is detected, it is likely that the target acceleration G1tgt for trailing travel is selected as the mediated target acceleration Gfin. Therefore, in this case, the own vehicle VA decelerates so as to ensure/acquire an appropriate inter-vehicle distance with respect to the objective-forward-vehicle (i.e., appropriate inter-vehicle distance between the own vehicle VA and the objective-forward-vehicle). As a result, the inter-vehicle distance between the own vehicle VA and the objective-forward-vehicle becoming excessively short can be avoided, in a case where the predicted cut-in vehicle does not actually cut in.

In addition, when the front looking radar device 21 and the front-side looking radar device (22L, 22R) detect the same (identical) target object, the first device integrates/merges the target object information (first target object information) that the front looking radar device 21 obtains and the target object information (second target object information) that the front-side looking radar device (22L, 22R) obtains so as to obtain the integrated target object information. Thereafter, the first device determines the presence or absence of the predicted cut-in vehicle based on the integrated target object information, and further, calculates the target acceleration (G2tgt) for cut-in vehicle regarding (for) the predicted cut-in vehicle when the predicted cut-in vehicle is determined to exist. The target acceleration (G2tgt) for cut-in vehicle may be set at a value obtained on the assumption that the brake device is operated. In other words, the target acceleration (G2tgt) for cut-in vehicle is allowed to become a "negative acceleration whose absolute value is large (i.e., large deceleration)".

On the other hand, when the predicted cut-in vehicle is detected based solely/only on the "second target object information obtained by the front-side looking radar device", the first device obtains the target acceleration (G3tgt) for cut-in vehicle while providing the limitation on the target acceleration (G3tgt) for cut-in vehicle in such a manner that the target acceleration (G3tgt) for cut-in vehicle does not become smaller than the "negative acceleration realized/achieved when the throttle valve opening of the internal combustion engine of the own vehicle VA is "0 (or, the throttle valve is fully-closed)" while the brake device of the own vehicle VA is not operated". Accordingly, when the cutting-in does not actually occur, the strong deceleration of the own vehicle VA due to the predicted cut-in vehicle does not occur. Thus, the driver avoids the odd feeling of rapid deceleration.

Second Embodiment

A vehicle travelling control device according to the second embodiment of the present disclosure (hereinafter, referred to as a "second device") will next be described. The second device is different from the first device only in the following points.

(1) The second device neither comprises the front-side looking radar device 22L nor the front-side looking radar device 22R.

Figure 8:
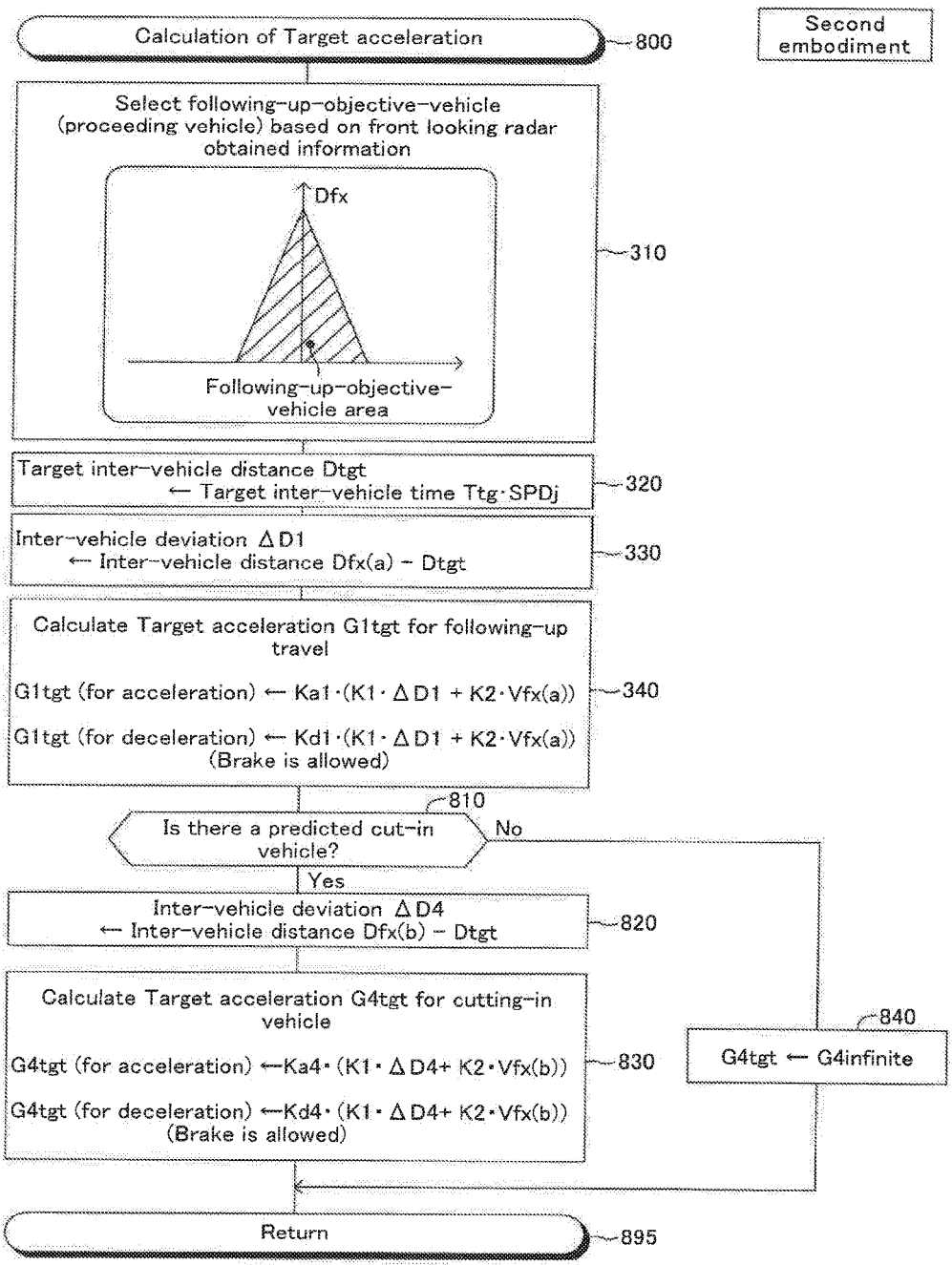
FIG. 8 is a flowchart showing a routine executed by a CPU of a vehicle travelling control device according to a second embodiment of the present disclosure.
Figure 9:
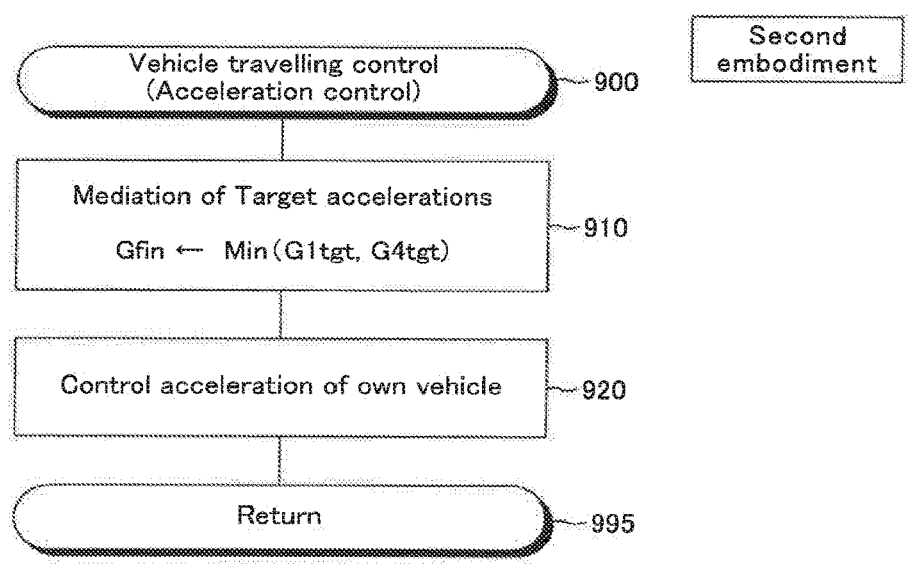
FIG. 9 is a flowchart showing a routine executed by the CPU of the vehicle travelling control device according to the second embodiment of the present disclosure.

(2) The second device executes a routine shown in FIG. 8 in place of the routines shown in FIGS. 3 and 4, and executes a routine shown in FIG. 9 in place of FIG. 7.

Those different points will next be mainly described.

The CPU of the second device executes the "target acceleration calculation routine" shown in FIG. 8, every elapse of a predetermined time. It should be noted that the reference number given to the step shown in FIG. 3 is given to a step shown in FIG. 8 whose process is the same as the process of step shown in FIG. 3. The detailed description about such a step will be omitted.

At an appropriate point in time, the CPU starts processing from step 800 shown in FIG. 8 to execute the processes from step 310 to step 340 in this order. Consequently, the target acceleration G1tgt for trailing travel is calculated.

Subsequently, the CPU proceeds to step 810 to determine if there is a predicted cut-in vehicle. In this case, the CPU applies the lateral distance Dfy(n) and the lateral relative speed Vfy(n) of each of "target objects other than the target object which is determined to be the objective-forward-vehicle (a) at step 310, among the target objects (n) that the front looking radar device 21 detects" to the area map WS shown in FIG. 5, so as to obtain the cut-in event probability P of each of the target objects. The CPU determines that there is a predicted cut-in vehicle when there is a target object whose cut-in event probability P is equal to or higher than the predetermined value (e.g., 60%), similarly to step 420. That is, the CPU specifies that target object as the predicted cut-in vehicle.

When it is determined that there is the predicted cut-in vehicle, the CPU makes a "Yes" determination at step 810 to execute processes of step 820 and step 830 described below in this order, and then, proceeds to step 895 so as to end the present routine tentatively.

Step 820: The CPU calculates an inter-vehicle deviation (difference) ΔD4 by subtracting the target inter-vehicle distance Dtgt from the inter-vehicle distance Dfx(b). The inter-vehicle distance Dfx(b) is the inter-vehicle distance Dfx(n) of the target object (b) which is determined to be the predicted cut-in vehicle at step 810. It should be noted that the target inter-vehicle distance Dtgt used at step 820 is referred to as a "fourth set inter-vehicle distance", as a matter of convenience. The fourth set inter-vehicle distance may be the same as the first set inter-vehicle distance, or may be a value which becomes closer to the first set inter-vehicle distance from a value smaller than the first set inter-vehicle distance by a positive first value as an "elapsed time t from a point in time at which it was determined that there was the predicted cut-in vehicle" becomes longer. In this case, the target inter-vehicle time for calculating the fourth set inter-vehicle distance may be a time obtained by multiplying the "target inter-vehicle time Ttgt used when the first set inter-vehicle distance is calculated" by the "coefficient s(t)" which comes closer to and converges on "1" from a value between "0" and "1" as the above mentioned time t becomes longer.

Step 830: The CPU calculates the target acceleration G4tgt for cut-in vehicle according to either one of a formula (12) and a formula (13) described below. The target acceleration G4tgt for cut-in vehicle is referred to as a "fourth target acceleration", as a matter of convenience.

In the formula (12) and the formula (13), Vfx(b) is the relative speed Vfx(n) of the target object (b) which was determined to be the predicted cut-in vehicle at step 810, and "K1, and K2" are the same gains as the "K1, and K2" used in the formula (1) and the formula (2), respectively. The CPU uses the formula (12) below when a value (K1·ΔD4+K2·Vfx(b)) is positive.

Ka4 is a positive gain (coefficient) for acceleration, and is set at a value which is equal to or smaller than the gain Ka1 used in the above formula (1) (or than the gain Kat used at step 340 shown in FIG. 8).

The CPU uses the formula (13) below when the value (K1·ΔD4+K2·Vfx(b)) is negative.

Kd4 is a positive gain (coefficient) for deceleration, and is set at a value which is equal to or smaller than the gain Kd1 used in the above formula (2) (or than the gain Kd1 used at step 340 shown in FIG. 8).

$$G4tgt(\text{for acceleration}) = Ka4 \cdot (K1 \cdot \Delta D4 + K2 \cdot Vfx(b)) \cdot \quad (12)$$

$$G4tgt(\text{for deceleration}) = Kd4 \cdot (K1 \cdot \Delta D4 + K2 \cdot Vfx(b)) \quad (13)$$

The target acceleration G4tgt for cut-in vehicle for deceleration calculated based on the formula (13) above is calculated in such a manner that the target acceleration G4tgt is allowed to be an acceleration (negative acceleration) realized/achieved when the brake device of the own vehicle VA is operated, similarly to the target acceleration G1tgt for trailing travel. In the above manner, the target acceleration G4tgt for cut-in vehicle is calculated based solely/only on the front looking radar obtained information.

In contrast, when the CPU determines that there is no predicted cut-in vehicle upon the execution of step 810, the CPU makes a "No" determination at step 810 to proceed to step 840, at which the CPU sets the target acceleration G4tgt for cut-in vehicle at the "imaginary acceleration G4infinite" which is larger than the maximum acceleration that the own vehicle VA can realize. Thereafter, the CPU proceeds to step 895 to end the present routine tentatively.

Further, at an appropriate point in time, the CPU starts processing from step 900 a "routine for mediation of target acceleration and vehicle travel control" shown in FIG. 9, to execute processes of step 910 and step 920 in this order, and proceeds to step 995 to end the present routine tentatively.

Step 910: The CPU selects either one of the target acceleration G1tgt for trailing travel and the target acceleration G4tgt for cut-in vehicle, whichever is smaller, and sets the selected target acceleration as the "final target acceleration (mediated/adjusted target acceleration) Gfin." That is, the CPU mediates among two kinds of target accelerations.

Step 920: The CPU sends the mediated target acceleration Gfin to the engine ECU 30 and the brake ECU 40 in order to make the acceleration of the own vehicle VA become equal to the mediated target acceleration Gfin. The engine ECU 30 and the brake ECU 40 control (drive) the engine actuators 32 and the brake actuators 42, respectively, based on the mediated target acceleration Gfin. As a result, the actual acceleration of the own vehicle VA is made to become equal to the mediated target acceleration Gfin. In this manner, the trailing inter-vehicle distance control is performed.

As described above, the second device calculates the target acceleration G1tgt for trailing travel, and the target acceleration G4tgt for cut-in vehicle, and sets the smaller target acceleration among them as the "final target acceleration (mediated/adjusted target acceleration) Gfin."

Accordingly, similarly to the first device, when the target acceleration G4tgt for cut-in vehicle is selected as the mediated target acceleration Gfin in a case where the predicted cut-in vehicle is detected, the own vehicle VA decelerates so as to increase the inter-vehicle distance between the own vehicle VA and the objective-forward-vehicle. Thus, when the predicted cut-in vehicle actually cuts in, the inter-vehicle distance with respect to the cut-in vehicle (i.e., distance between the own vehicle VA and the predicted cut-in vehicle that is now an actual cut-in vehicle) becomes appropriate in a short time. In addition, if the objective-forward-vehicle starts to rapidly decelerate after a point in time at which the predicted cut-in vehicle is detected, it is likely that the target acceleration G1tgt for trailing travel is selected as the mediated target acceleration Gfin. Therefore, in this case, the own vehicle VA decelerates so as to ensure/acquire an appropriate inter-vehicle distance with respect to the objective-forward-vehicle (i.e., appropriate inter-vehicle distance between the own vehicle VA and the objective-forward-vehicle). As a result, the inter-vehicle distance between the own vehicle VA and the objective-forward-vehicle becoming excessively short can be avoided, in a case where the predicted cut-in vehicle does not actually cut in.

The present disclosure is not limited to the embodiments described above, and various modifications may be adopted within the scope of the present disclosure. For example, as shown in FIGS. 1 and 2, each of the first device and the second device may comprise a stereo camera 101 which can communicate with the driving support ECU through the CAN 100. The stereo camera 101 is positioned at an upper portion of a front window within a passenger room, and acquires a stereo image in a straight forward direction of the own vehicle VA. From the stereo image, the stereo camera 101 obtains the target object information, and lane markers (white lines). The stereo camera 101 can recognize the running lane based on the lane markers, and the like. In this case, the first device and the second device may obtain the objective-forward-vehicle and the predicted cut-in vehicle from the target object information that the front looking radar device 21 and the stereo camera 101 acquire. Further, the first device and the second device may estimate a course of the own vehicle VA based on the information concerning the running lane obtained from the stereo camera 101, and may modify the target information which is obtained by the front looking radar device 21 and/or the front-side looking radar device 22L, 22R in consideration of the estimated course, for example, in such a manner that the lateral position of the target object become a target position in a direction orthogonal to the estimated course.

Further, the first device and the second device may be configured to determine whether or not there is a predicted cut-in vehicle using a map other than the map shown in FIG. 5. For example, the first device and the second device may be configured to determine whether or not there is a predicted cut-in vehicle in consideration of not only the lateral position and the lateral relative speed of the vehicles other than the objective-forward-vehicle but also the inter-vehicle distance of the vehicles.

What is claimed is:

1. A vehicle travelling control device comprising:
   detecting means for detecting an objective-forward-vehicle traveling in front of an own vehicle and a vehicle which is predicted to cut in between said own vehicle and said objective-forward-vehicle;
   first calculation means for calculating a first target acceleration for the own vehicle to maintain an inter-vehicle distance between said own vehicle and said objective-forward-vehicle at a first set inter-vehicle distance;
   second calculation means for calculating a second target acceleration required for said own vehicle to maintain an inter-vehicle distance between said own vehicle and said predicted cut-in vehicle at a second set inter-vehicle distance;
   mediation means for selecting, as a mediated target acceleration, either said first target acceleration or said second target acceleration, whichever is smaller; and
   travel control means for controlling a driving force and a brake force of said own vehicle in such a manner that an actual acceleration of said own vehicle becomes closer to said mediated target acceleration,
   wherein:
   said detecting means includes
      a front looking radar device having a front looking detection area, the front looking detection area having a center axis extending in a straight forward direction of said own vehicle, the front looking radar detects a target object to obtain first target object information concerning said target object, and
      a front-side looking radar device having a front-side detection area, the front-side detection area having a center axis extending in a diagonally forward direction of said own vehicle, the front-side looking radar detects said target object to obtain second target object information concerning said target object;
   said vehicle travelling control device further comprises predicted cut-in vehicle detecting means for
      integrating said first target object information and said second target object information to obtain an integrated target object information, and detecting said predicted cut-in vehicle based on said integrated target object information, when said front looking radar device and said front-side looking radar device detect an identical target object, and
      detecting said predicted cut-in vehicle based on said second target object information but not based on said first target object information, when said front-side looking radar device detects said target object, but said front looking radar device does not detect said target object and
   said second calculation means
      calculates said first target acceleration in such a manner that said first target acceleration is allowed to be a negative acceleration achieved when a brake device of said own vehicle is operated, in a case where said predicted cut-in vehicle is detected based on said integrated target object information, and
      calculates said first target acceleration while providing a limitation on said first target acceleration in such a manner that said first target acceleration does not become smaller than a negative acceleration achieved when a throttle valve opening of an internal combustion engine serving as a driving force of said own vehicle is set at a minimum value while said brake device of said own vehicle is not operated, in a case where said predicted cut-in vehicle is detected based on said second target object information but not based on said first target object information.

2. A vehicle travelling control device comprising:
   a radar system that detects an objective-forward-vehicle traveling in front of an own vehicle and a vehicle which is predicted to cut in between said own vehicle and said objective-forward-vehicle;
   an electronic control unit configured to
      calculate a first target acceleration for the own vehicle to maintain an inter-vehicle distance between said own vehicle and said objective-forward-vehicle at a first set inter-vehicle distance,
      calculate a second target acceleration required for said own vehicle to maintain an inter-vehicle distance between said own vehicle and said predicted cut-in vehicle at a second set inter-vehicle distance, and
      select, as a mediated target acceleration, either said first target acceleration or said second target acceleration, whichever is smaller;
   an engine electronic control unit; and
   a brake electronic control unit;
   wherein the engine electronic control unit and the brake electronic control unit control a driving force and a brake force, respectively, of said own vehicle in such a manner that an actual acceleration of said own vehicle becomes closer to said mediated target acceleration,
   wherein said radar system includes
      a front looking radar device having a front looking detection area, the front looking detection area having a center axis extending in a straight forward direction of said own vehicle, the front looking radar detects a target object to obtain first target object information concerning said target object, and a front-side looking radar device having a front-side detection area, the front-side detection area having a center axis extending in a diagonally forward direction of said own vehicle, the front-side looking radar detects said target object to obtain second target object information concerning said target object, and wherein said electronic control unit is further configured to integrate said first target object information and said second target object information to obtain an integrated target object information, and detect said predicted cut-in vehicle based on said integrated target object information, when said front looking radar device and said front-side looking radar device detect an identical target object, detect said predicted cut-in vehicle based on said second target object information but not based on said first target object information, when said front-side looking radar device detects said target object, but said front looking radar device does not detect said target object, calculate said first target acceleration in such a manner that said first target acceleration is allowed to be a negative acceleration achieved when a brake device of said own vehicle is operated, in a case where said predicted cut-in vehicle is detected based on said integrated target object information, and calculate said first target acceleration while providing a limitation on said first target acceleration in such a manner that said first target acceleration does not become smaller than a negative acceleration achieved when a throttle valve opening of an internal combustion engine serving as a driving force of said own vehicle is set at a minimum value while said brake device of said own vehicle is not operated, in a case where said predicted cut-in vehicle is detected based on said second target object information but not based on said first target object information.

\* \* \* \* \*